United States Patent Office.

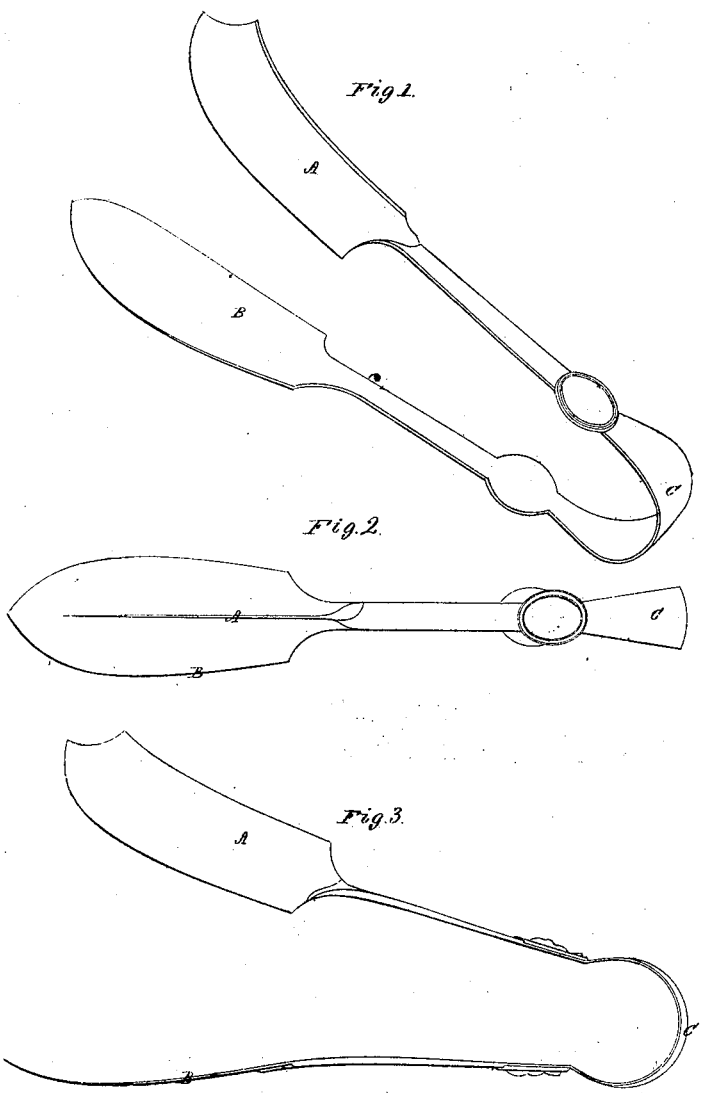

JORGE OYARZABAL, OF MALAGA, SPAIN.

Letters Patent No. 95,929, dated October 19, 1869.

IMPROVED ICE-CREAM SERVER.

The Schedule referred to in these Letters Patent and making part of the same.

*To all persons to whom these presents may come:*

Be it known that I, JORGE OYARZABAL, of Malaga, of the Kingdom of Spain, have invented a new and useful Implement, which may be termed an Ice-Cream Server, its purpose being to enable a person by means of it to cut up and serve for being eaten a mould or form of iced cream, the said implement being useful for various other domestic purposes; and I do hereby declare the said invention to be described in the following specification, and represented in the accompanying drawings, of which—

Figure 1 is a perspective view,
Figure 2, a top view, and
Figure 3, a side elevation of it.

It consists of a knife, A, and a flat scoop, spade, or blade, B, arranged at right angles to each other, and connected by a spring or elastic bow-shank, C. Or they may be connected like the legs of tongs, and be provided with a spring to open or move them apart.

By grasping the elastic bow-shank in and squeezing it by the hand, an individual may force the knife toward the scoop or blade, when a pyramid or form of iced cream may be interposed between them. The knife will be caused to cut into the mass of iced cream, which will be supported against the scoop or blade, and by means of the two a piece may be severed from the mass and transferred to a plate.

I claim, as my invention—

The implement or ice-cream server, substantially as described, that is, as composed of the knife A, blade B, and spring-bow C, arranged as set forth.

JORGE OYARZABAL.

Witnesses:
R. H. EDDY,
S. N. PIPER.